Frederick Marshall Hunter
INVENTOR.

March 31, 1959     F. M. HUNTER     2,879,674
MACHINE FLYWHEELS

Filed Nov. 29, 1955     3 Sheets-Sheet 2

Frederick Marshall Hunter
INVENTOR.

March 31, 1959  F. M. HUNTER  2,879,674
MACHINE FLYWHEELS
Filed Nov. 29, 1955  3 Sheets-Sheet 3

Frederick Marshall Hunter
INVENTOR.

BY *Clarence A. O'Brien*
*and Harvey B. Jacobson*
Attorneys

United States Patent Office 2,879,674
Patented Mar. 31, 1959

2,879,674

MACHINE FLYWHEELS

Frederick Marshall Hunter, Milwaukee, Wis.

Application November 29, 1955, Serial No. 549,655

8 Claims. (Cl. 74—572)

This invention relates in general to new and useful improvements in machine elements, and more specifically to an improved machine flywheel assembly.

It is well known that in flywheel construction it is highly desirable that a maximum amount of the mass of a flywheel be placed the greatest distance from the axis of rotation of such flywheel inasmuch as not only is the weight of the flywheel critical, but also the distance of such weight from the axis of rotation. It is therefore the primary object of this invention to provide a machine flywheel which is annular in outline and which has no central portion, the flywheel being mounted between sets of rollers whereby substantially all of the mass of the flywheel is disposed in equal distance from the center thereof.

Another object of this invention is to provide a machine flywheel construction which includes an annular flywheel primarily mounted on an idler shaft and which bears against a power shaft and is simultaneously driven thereby and drives such power shaft.

Another object of this invention is to provide a machine flywheel assembly which includes a power shaft and an idler shaft, the idler shaft being disposed above and offset from the power shaft, an annular flywheel passing over the idler shaft and bearing against the power shaft whereby the machine flywheel is supported for rotation without requiring a center support.

Still another object of this invention is to provide a machine flywheel which is of the annular type whereby the formation of the flywheel is relatively simple and at the same time a relatively small amount of weight will produce the greatest flywheel action.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4:
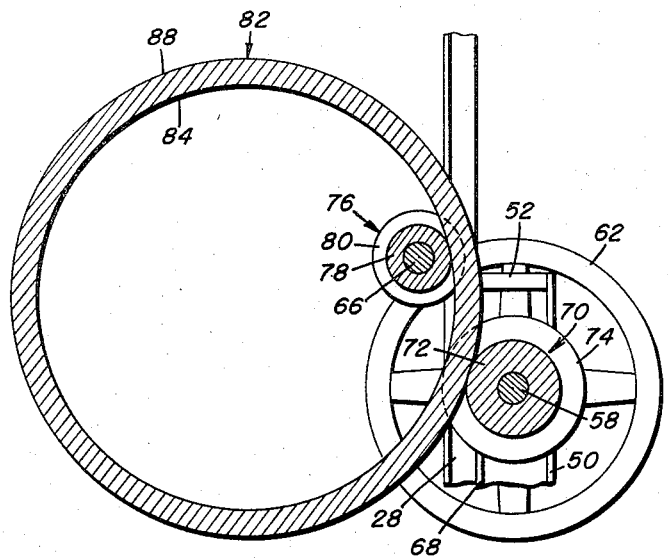
Figure 3:
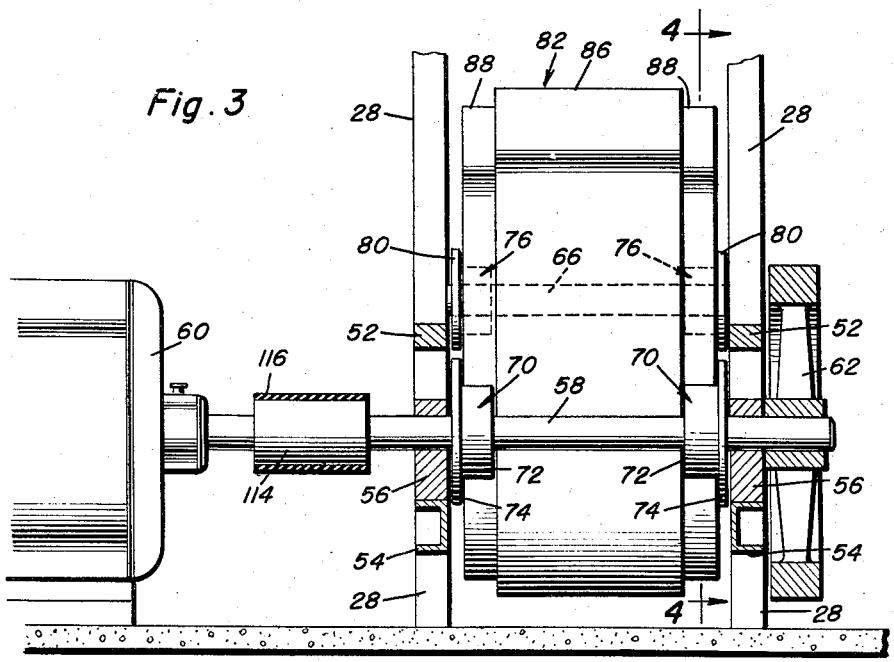

Figure 3 is an enlarged fragmentary transverse vertical sectional view showing further the details of the relationship between the main power shaft and the flywheel; and Figure 4 is an enlarged fragmentary vertical sectional view taken substantially upon the plane indicated by the section line 4—4 of Figure 3 and shows the specific relationship between an end portion of one of the flywheels and both a drive roller and an idler roller.

Referring now to the drawings in detail, it will be seen that there is illustrated a machine drive assembly which is referred to in general by the reference numeral 10. The machine drive assembly 10 incorporates a pair of the machine flywheel assemblies which are the subject of this invention.

The machine flywheel assembly 10 includes a suitable concrete base which may be in the form of a building floor or other suitable structure. Extending upwardly from the central portion of the base 12 is a machine base which is referred to in general by the reference numeral 14. The machine base 14 include a sloping portion 16 which preferably slopes upwardly to the right at a 45° angle and terminates in a workman's platform 18. The workman's platform 18 is horizontal and is preferably covered with a suitable non-skid covering 20.

The machine drive assembly 10 includes a frame which is referred to in general by the reference numeral 22. The frame 22 includes a pair of lower frame rails 24 which are connected together at one end by a transverse frame member 26. The frame rails 24 and the frame member 26 are disposed in generally U-shaped pattern and extend around the bottom of the machinery base 14. Extending upwardly from the rails 24 at their intersections with the frame member 26 are uprights 28. Extending upwardly from the machinery base 14 at the intersection of its sloping portion 16 with the workman platform 18 are uprights 30. The uprights 30 are connected at their upper ends to the upper ends of the uprights 28 by suitable longitudinal frame members 32. The upper ends of the uprights 30 are also connected together by a transverse frame member 34.

Extending upwardly from the frame rails 24 at the ends thereof remote from the transverse frame member 26 are uprights 36. The upper ends of the uprights 36 are connected together by a transverse frame member 38. The upper ends of the uprights 36 are also connected to the upper ends of the uprights 30 by means of longitudinal frame members 40. The longitudinal frame members 40 are faced intermediate their ends by uprights 42 which also extend upwardly from the machinery base 14. Secured to and covering the area defined by the frame members 34, 38 and 40 is a suitable cover 44.

Access to the workman's platform 18 is accomplished by means of a ladder 46 which extends upwardly along one side of the machinery base 14 between the uprights 36 and 42 thereof. Suitable guard rails 48 are also provided to prevent injury to a workman through falling.

Secured to each of the frame rails 24 and extending upwardly therefrom in spaced parallel relation to a respective one of the uprights 28 is a support member 50. The upper end of each of the support member 50 is connected to its associated upright 28 by a brace 52. An intermediate portion of each support member 50 is connected to its adjacent upright 28 by a suitable channel shaped cross sectional bracket 54.

Carried by each of the brackets 54 and extending upwardly therefrom between the associated support member 50 and upright 28 is a pillow block 56. The pillow blocks 56 are disposed in transverse alignment with respect to the frame 22 and have journaled therein an elongated main power shaft 58. One end of the main power shaft 58 is connected to a suitable power unit which for the purposes of illustration has been shown as an electric motor. However, it is to be understood that any type of power source may be provided including an electric motor, an internal combustion engine, wind or tide motors, etc. For illustration purposes, the end of the main power shaft 58 remote from the power unit 60 is provided with a combined flywheel and drive pulley 62. The power take-off from this combined flywheel and drive pulley 62 is accomplished by means of a belt (not shown) or other mechanical means.

Secured to each upright 28 on the side thereof remote from its associated pillow block 56 and above the pillow block 56 is a pillow block 64. Journaled in the pillow block 64 for rotation is an idler shaft 66. It is to be noted that the idler shaft 66 is disposed above and offset from the main power shaft 58.

It is pointed out at this time that if desired, the lower portion of each upright 28 may be reinforced by a strap member 68. The strap member 68 converts the lower portion of each upright 28 from its normal angle iron construction to a channel shaped member.

Carried by the main power shaft 58 between the pillow blocks 56 and adjacent the same is a pair of drive rollers 70. Each drive roller 70 includes a main hub portion 72 and a flange 74, the flanges 74 of the drive rollers 70 being disposed in remote relation.

Carried by the idler shaft 66 adjacent the pillow blocks 64 is a pair of idler rollers which are referred to in general by the reference numeral 76. Each idler roller 76 includes a main hub portion 78 and a flange 80 at one end thereof. The flanges 80 of the idler rollers 76 are disposed in remote relation.

Each of the flywheel assemblies includes a flywheel which is referred to in general by the reference numeral 82. The flywheel 82 is generally annular in outline and includes a smooth inner surface 84. The flywheel 82 also includes a smooth central exterior surface 86 and recessed exterior surfaces 88 at opposite ends thereof.

The flywheel 82 is mounted between the uprights 28 with the idler shaft 66 passing therethrough. The idler rollers 76 have the hub portions 78 thereof in engagement with the interior surface 84 adjacent the opposite ends thereof. The flanges 80 of the idler rollers 76 engage the ends of the flywheel 82 to position the flywheel 82.

As is best illustrated in Figures 3 and 4, the hub portions 72 of each of the drive rollers 70 engage the recessed exterior surface 88 of the flywheel 82 with which it is aligned. Further, the flange 74 of each drive roller 70 engages in adjacent the end of the flywheel 82 to further position it with respect to the main drive shaft 58 of the idler shaft 66.

Although the drive assembly 10 incorporates two flywheel assemblies, inasmuch as the drive assembly will operate with one or more such flywheel assemblies, the operation of the invention will be described at this time. Normally the flywheel 82, as is best illustrated in Figure 4, rests upon the hub portions 78 of the idler rollers 76 and bears against the hub portions 72 of the drive rollers 70. When in the position illustrated in Figure 4, the flywheel 82 is statically at rest. However, when driven in a counterclockwise direction, as viewed in Figure 4, by the drive rollers 70, the flywheel 82 will be continuously driven about the idler rollers 76 to function as normal flywheel action. While the drive rollers 70 drive the flywheel 82, they also function as driven rollers inasmuch as the flywheel 82 turns the power shaft 58 through the drive rollers 70. It is to be noted that substantially all of the mass of the flywheel 82 is disposed equidistant from a center thereof, the center structure of the flywheel being entirely eliminated. Thus with a given mass or weight, the flywheel 82 has a greater inertia once driven than other flywheels of equal mass. It will therefore be readily apparent that the use of the particular flywheel 82 and the manner in which it is mounted produces a highly desirable flywheel action with a minimum of weight. This is the more apparent advantage of the present invention.

Figure 1:
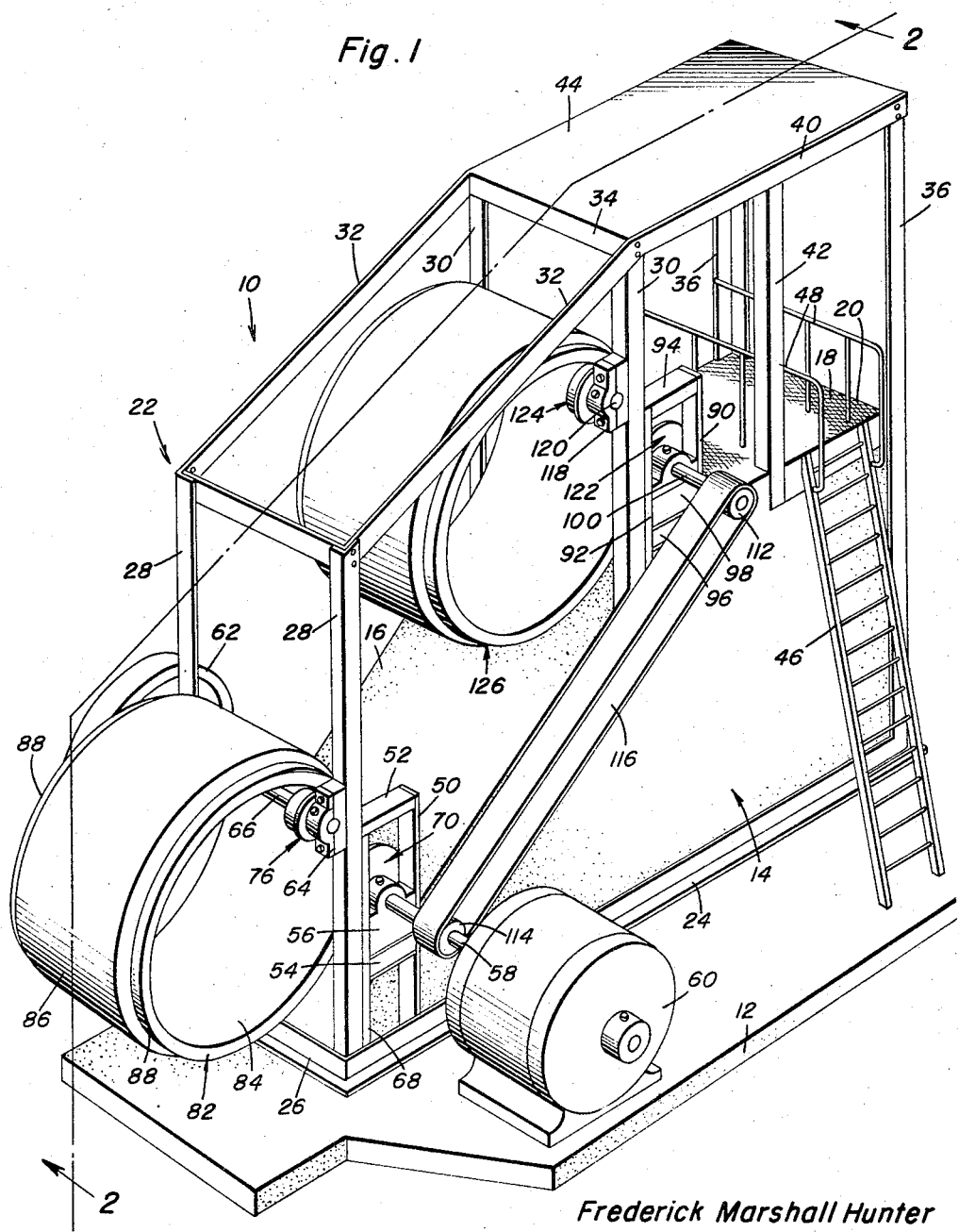
Figure 1 is a perspective view of the machine flywheel assembly which is the subject of this invention and shows two of the flywheels connected in unison for operation with a single main power shaft.
Figure 2:
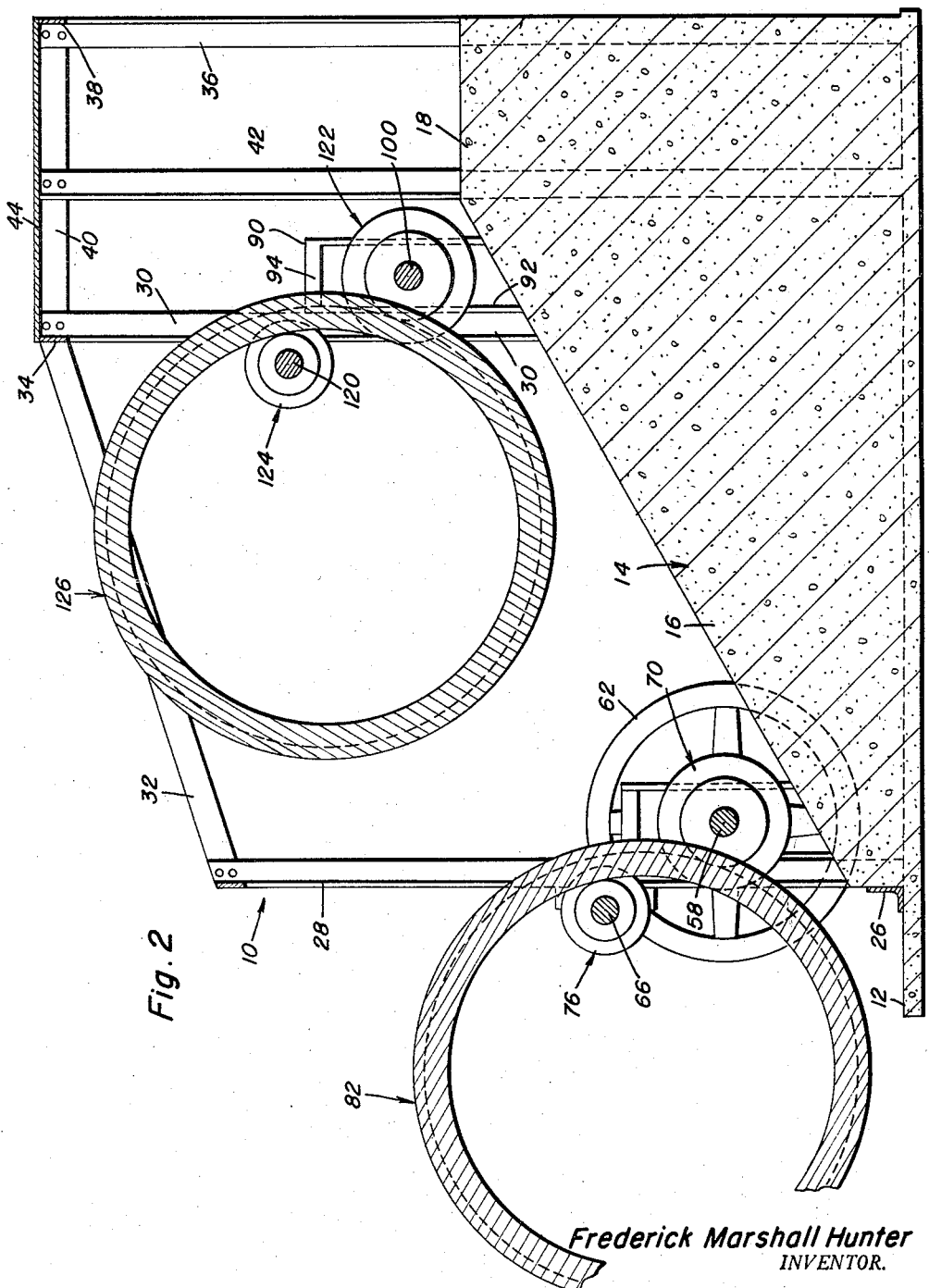
Figure 2 is an enlarged vertical sectional view taken substantially upon the plane indicated by the section line 2—2 of Figure 1 and shows the specific details of the flywheel with respect to the power shafts and idler shafts supporting the same.

Referring once again to Figure 1 in particular, it will be seen that there extends upwardly from the machinery base 14 to the right of each of the uprights 30 a support member 90. The lower portion of each of the uprights 30 is also reinforced by a strap 92 which is disposed in spaced parallel relation to the support member 90. The upper ends of the strap 92 and the support member 90 are connected together by a brace 94. A channel shaped cross sectional bracket 96 extends between the intermediate portions of the strap 92 and the support member 90.

Carried by each of the brackets 96 is a pillow block 98, the pillow blocks 98 being transversely aligned. Extending between the pillow blocks 98 and rotatably journaled therein is an auxiliary power shaft 100. The power shaft 100 is provided at one end thereof with a pulley 112. A similar pulley 114 is mounted on an intermediate portion of the main power shaft 58. A drive belt 116 is entrained over the pulleys 112 and 114 to connect the auxiliary power shaft 100 to the main power shaft 58.

Secured to each of the uprights 30 above the pillow block 98 in offset relation thereto is a pillow block 118. Suitably journaled in the pillow blocks 118, which are transversely aligned, is an idler shaft 120.

Carried by the auxiliary power shaft 100 in spaced relation is a pair of drive rollers 122. The drive rollers 122 are identical with the drive rollers 70 and need not be described in further detail. Carried by the idler shaft 120 in spaced relation is a pair of idler rollers 124. The idler rollers 124 are identical with the idler rollers 76 and also need not be described in further detail.

Engaged over the idler rollers 124 and bearing against the drive rollers 122 is a flywheel which is referred to in general by the reference numeral 126. The flywheel 126 is identical with the flywheel 82 and cooperates with the idler rollers 124 and the drive rollers 122 in exactly the manner described above with respect to the flywheel 82, the idler rollers 76 and the drive rollers 70. The flywheel 126 merely increases the flywheel action imposed upon the main power shaft 58 by the flywheel 82 and if desired any number of flywheels 126 or 82 may be utilized.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A machine flywheel construction comprising a power shaft, an idler shaft disposed in parallel relation to said power shaft, said idler shaft being disposed above and offset from said power shaft, an annular flywheel, at least one idler roller on said idler shaft, at least one drive roller on said power shaft, said idler shaft passing through said flywheel with said idler roller engaging an interior surface of said flywheel, said drive roller engaging the exterior of said flywheel, said idler roller being disposed below the extreme top of said interior surface whereby said flywheel has a tendency to roll about said idler roller, flanges on said rollers engaging ends of said flywheel to retain said flywheel aligned with said rollers.

2. A machine flywheel construction comprising a power shaft, an idler shaft disposed in parallel relation to said power shaft, said idler shaft being disposed above and offset from said power shaft, an annular flywheel, at least one idler roller on said idler shaft, at least one drive roller on said power shaft, said idler shaft passing through said flywheel with said idler roller engaging an interior surface of said flywheel, said drive roller engaging the exterior of said flywheel, said idler roller being disposed below the extreme top of said interior surface whereby said flywheel has a tendency to roll about said idler roller, said flywheel being supported only by said rollers.

3. A machine flywheel construction comprising a power shaft, an idler shaft disposed in parallel relation to said power shaft, said idler shaft being disposed above and offset from said power shaft, an annular flywheel, at least one idler roller on said idler shaft, a pair of drive rollers mounted on said drive shaft in spaced relation, said idler shaft passing through said flywheel with said idler roller engaging an interior surface of said flywheel, recesses in an exterior surface of said flywheel at opposite ends thereof, said drive rollers being seated in said recesses and engaging said exterior surface, said idler roller being disposed below the extreme top of said interior surface whereby said flywheel has a tendency to roll about said idler roller.

4. A machine flywheel construction comprising a power shaft, an idler shaft disposed in parallel relation to said power shaft, said idler shaft being disposed above and offset from said power shaft, an annular flywheel, at least one idler roller on said idler shaft, a pair of drive rollers mounted on said drive shaft in spaced relation, said idler shaft passing through said flywheel with said idler roller engaging an interior surface of said flywheel, recesses in an exterior surface of said flywheel at opposite ends thereof, said drive rollers being seated in said recesses and engaging said exterior surface, said idler roller being disposed below the extreme top of said interior surface whereby said flywheel has a tendency to roll about said idler roller, said flywheel being supported only by said rollers.

5. A machine flywheel construction comprising a power shaft, an idler shaft disposed in parallel relation to said power shaft, said idler shaft being disposed above and offset from said power shaft, an annular flywheel, at least one idler roller on said idler shaft, a pair of drive rollers mounted on said drive shaft in spaced relation, said idler shaft passing through said flywheel with said idler roller engaging an interior surface of said flywheel, recesses in an exterior surface of said flywheel at opposite ends thereof, said drive rollers being seated in said recesses and engaging said exterior surface, said idler roller being disposed below the extreme top of said interior surface whereby said flywheel has a tendency to roll about said idler roller, flanges on said power rollers engaging said flywheel ends to retain said flywheel in alignment with power rollers.

6. A machine flywheel construction comprising a power shaft, an idler shaft disposed in parallel relation to said power shaft, said idler shaft being disposed above and offset from said power shaft, an annular flywheel, at least one idler roller on said idler shaft, a pair of drive rollers mounted on said drive shaft in spaced relation, said idler shaft passing through said flywheel with said idler roller engaging an interior surface of said flywheel, recesses in an exterior surface of said flywheel at opposite ends thereof, said drive rollers being seated in said recesses and engaging said exterior surface, said idler roller being disposed below the extreme top of said interior surface whereby said flywheel has a tendency to roll about said idler roller, said flywheel having an axis, a horizontal plane passing through said axis, said power shaft being disposed below said horizontal axis.

7. A machine flywheel construction comprising a power shaft, an idler shaft disposed in parallel relation to said power shaft, said idler shaft being disposed above and offset from said power shaft, an annular flywheel, at least one idler roller on said idler shaft, a pair of drive rollers mounted on said drive shaft in spaced relation, said idler shaft passing through said flywheel with said idler roller engaging an interior surface of said flywheel, recesses in an exterior surface of said flywheel at opposite ends thereof, said drive rollers being seated in said recesses and engaging said exterior surface, said idler roller being disposed below the extreme top of said interior surface whereby said flywheel has a tendency to roll about said idler roller, said idler shaft being disposed above said horizontal plane.

8. A machine flywheel construction comprising a power shaft, an idler shaft disposed in parallel relation to said power shaft, said idler shaft being disposed above and offset from said power shaft, an annular flywheel, at least one idler roller on said idler shaft, a pair of drive rollers mounted on said drive shaft in spaced relation, said idler shaft passing through said flywheel with said idler roller engaging an interior surface of said flywheel, recesses in an exterior surface of said flywheel at opposite ends thereof, said drive rollers being seated in said recesses and engaging said exterior surface, said idler roller being disposed below the extreme top of said interior surface whereby said flywheel has a tendency to roll about said idler roller, said flywheel having an axis, a horizontal plane passing through said axis, said power shaft being disposed below said horizontal, said idler shaft being disposed above said horizontal plane.

References Cited in the file of this patent

UNITED STATES PATENTS

| | | |
|---|---|---|
| 697,973 | Brenzinger | Apr. 22, 1902 |
| 1,511,547 | Wasson | Oct. 24, 1924 |
| 1,763,304 | Hahnemann | June 10, 1930 |
| 1,938,152 | Pulley | Dec. 5, 1933 |
| 2,119,880 | Horton | June 7, 1938 |
| 2,414,134 | Bartlett | Jan. 14, 1947 |
| 2,462,455 | Bartlett | Feb. 22, 1949 |

FOREIGN PATENTS

| | | |
|---|---|---|
| 9,643 of 1911 | Great Britain | Jan. 25, 1912 |
| 593,161 | Germany | Feb. 22, 1934 |